United States Patent Office 2,751,279
Patented June 19, 1956

2,751,279
PREPARATION OF CALCIUM TITANATE COMPOSITION

Leon Merker, Bronx, N. Y., assignor to National Lead Company, New York, N. Y., a corporation of New Jersey No Drawing. Application September 18, 1953, Serial No. 381,115

3 Claims. (Cl. 23—51)

This invention relates to a novel calcium titanate composition of matter especially adapted for use as dielectric material or as a starting material for the preparation of single crystals of calcium titanate.

In preparation of single crystals or dielectric material in general, it is necessary to employ a raw material which conforms to necessary requirements, such as for example, purity and particle size. In preparing the various raw materials for making single crystals, it is difficult to obtain the high quality demanded for single crystal production.

Calcium titanate is normally prepared by calcining a mixture of titanium dioxide and calcium carbonate at elevated temperature. The type of titanate produced by this method, however, is not of sufficient purity to be used as raw material for single crystal production even though C. P. grade (chemically pure) raw materials, which are the purest commercially available, are employed. The C. P. grade raw materials invariably have quantities of alkali metal and alkaline earth metal compounds present which apparently cannot be conveniently or readily removed. When produced by calcining titanium dioxide and calcium carbonate, the titanate usually is not homogeneous and therefore varies from the theoretical composition throughout the mass. Furthermore, this type of material does not possess the necessary particle size for single crystal production.

An object of this invention, therefore, is to provide a calcium titanate composition which is capable of being used as raw material in forming calcium titanate single crystals. A further object is to provide a simple method for the production of high quality calcium titanate composition which may be used as dielectric material. Another object is to provide a method by which calcium titanate of extraordinary purity may be produced from commercially available raw materials which will be suitable for production of single crystals. Another object is to provide a product which has a relatively high bulk density which possesses good free-flowing characteristics. These and other objects will become apparent from the following more complete description of the present invention.

In its broadest aspects this invention contemplates finely divided calcium titanate of a character adapted for the manufacture of dielectric and single crystals. Such a composition will comprise a free-flowing finely divided substantially pure, substantially uniform, calcium titanate which is formed by calcination of a precipitated double salt, and is characterized by an ultimate unit particle size between about 0.1 and 1.0 micron, a majority of said particles being present in aggregated form, the aggregates being of size to pass through 100 mesh screen but retained on 325 mesh screen. Such material will have a bulk density of between about 40 and about 60 lbs. per cubic foot. This invention further contemplates a method for the production of substantially pure calcium titanate which comprises first forming the double salt calcium titanium sulfate as a precipitate, and subsequently calcining this precipitate until the sulfate values are destroyed and calcium titanate composition is obtained.

In preparing this composition it is preferred to precipitate calcium titanium sulfate by concentrating to $SO_3$ fumes a concentrated solution containing calcium sulfate and titanium sulfate. The precipitate should be washed thoroughly, preferably with distilled water, until the filtrate is free from soluble sulfates.

The calcination of the calcium titanium sulfate composition is not critical except for obtaining at least a minimum temperature, which will substantially completely destroy the sulfate values and form calcium titanate. It has been found that a minimum temperature of about 1100° C. and preferably about 1300° C. to 1500° C. is necessary to destroy the sulfate values and to form calcium titanate compound.

By the use of this method satisfactory purity of the calcium titanate has been obtained when employing C. P. grade (chemically pure) raw materials. Certain impurities, particularly the alkali metal and alkaline earth metal compounds, usually are present in excess of the tolerable amount in most C. P. materials, but the excess is readily removed during the precipitation and washing of the double salt. This method produces substantially pure calcium titanate from C. P. grade raw materials, while the prior art methods cannot produce substantially pure titanates from such commercially available high grade materials. A soft calcined product is obtained and when it is screened through 100 mesh screen it possesses good free-flowing properties and its bulk density falls within the desired range. Such material is readily adaptable for the manufacture of either calcium titanate dielectrics or single crystals.

The bulk density of the calcined calcium titanate product was determined on a Scott Volumeter. This procedure is described in detail on page 145 in "1949 Book of A. S. T. M. Standards," part 4.

Since there are no standard tests for measuring the free-flowing characteristics of such a material, the following test was developed.

A container 1 inch in diameter and 1 inch in height was filled (leveled off) with the calcined titanate material. The bottom of the container was held 12 inches from the table top by placing it on a suitable stand. The bottom of the container consisted of a trap door which was sprung open to permit the titanate powder to flow onto the table. The free-flowing characteristics were measured as the distance the material flowed from a point directly beneath the center of the container. The distance was measured in inches from the point. This distance is equal to the radius of the circular pattern formed by the flow of the material on the table. The calcium titanate material prepared by this invention flowed on the table to form a circle having a radius between five and ten inches.

In order to more fully illustrate the instant invention, the following example is presented:

EXAMPLE 1

*Preparation of titanium sulfate solution*

In order to prepare a titanium sulfate solution, 6.5 parts of finely divided and substantially pure titanium dioxide were added to 45 parts of hot concentrated (96%) sulfuric acid containing 12 parts of ammonium sulfate. The mixture was heated to boiling until a clear solution was obtained.

*Preparation of calcium sulfate solution*

In order to prepare a calcium sulfate solution, a freshly precipitated batch of calcium sulfate was produced.

43.2 parts of hydrated calcium chloride, $CaCl_2 \cdot 2H_2O$, were dissolved in 100 parts of water. 35 parts of concentrated sulfuric acid were diluted with 700 parts water, heated to 90° C., and added to the boiling solution of calcium chloride. Immediately a dense precipitate of calcium sulfate was formed. The calcium sulfate was filtered off and then dried at 110° C. 14 parts of the dried calcium sulfate were then dissolved in 50 parts of hot concentrated sulfuric acid.

*Preparation of double salt calcium titanium sulfate* $[CaTi(SO_4)_3]$

The solutions of titanium sulfate and calcium sulfate were then admixed with stirring, while hot, and were heated until heavy $SO_3$ fumes appeared and the solution turned cloudy. Upon further heating, a dense crystalline precipitate of the double salt calcium titanium sulfate was formed. Heating was discontinued after 12 hours. The precipitate was then filtered on a vacuum filter and the filter cake was washed with cold water until the wash liquor was free from sulfates. The filter cake was then air dried for 4 hours.

The dried cake was calcined at 1400° C. for 2 hours to destroy the sulfate values and to form calcium titanate. The calcined material weighed 10.5 parts which represents 95% recovery of the titanium values. The product analyzed 58.7% $TiO_2$, 41.1% CaO, <0.1% alkali metal oxides, <0.1% alkaline earth metal oxides and 0.08% silica. An X-ray of the final product showed only calcium titanate pattern. The calcined calcium titanate material was screened through a 100 mesh screen and the size of the aggregates was found to be as follows:

|  | Sieve size | Percentage |
| --- | --- | --- |
|  | +100 mesh | 0 |
| −100 | +150 mesh | 15 |
| −150 | +200 mesh | 35 |
| −200 | +250 mesh | 26 |
| −250 | +325 mesh | 20 |
| −325 |  | 4 |
|  |  | 100 |

Substantially all of the individual particles fell within the range between 0.1 and 1.0 micron. The bulk density of this material was 52 lbs. per cubic foot. With respect to the free-flowing characteristics, this product has a spread of 8 inches radius.

A single calcium titanate crystal was prepared by the flame fusion method described and claimed in co-pending application Serial No. 335,343, filed February 5, 1953, from the calcium titanate produced in this example.

The type of product produced by the instant process is finely divided and homogeneous and has the characteristics of being free-flowing. An average particle size of the calcium titanate product lies between 0.1 micron and 1.0 micron. Substantially all of the individual particles are present in the form of aggregates which fall within the range between 100 and 325 mesh. The bulk density lies between about 40 and 60 lbs. per cubic foot. In order to be useful, particularly for the manufacture of single crystals, the material must possess good free-flowing properties, high bulk density, small individual particle size, and substantially all of the particles in aggregated form. Such characteristics are essential in the material to be employed for the manufacture of dielectrics and particularly single crystals. This titanate product has been prepared from raw materials which normally are not sufficiently pure to produce a substantially pure titanate product.

While this invention has been described and illustrated by the examples shown, it is not intended to be strictly limited thereto, and other modifications and variations may be employed within the scope of the following claims.

I claim:
1. Preparation of finely divided calcium titanate adapted for the manufacture of single crystals which comprises admixing a titanium sulfate solution and a calcium sulfate solution, concentrating said mixture to $SO_3$ fumes to precipitate a double salt of calcium titanate sulfate, filtering and drying said precipitate, and calcining at elevated temperatures until the sulfate values are destroyed and the calcium titanate compound is obtained.
2. Method according to claim 1, in which the titanium sulfate solution is prepared by dissolving finely divided titanium dioxide in concentrated sulfuric acid containing ammonium sulfate.
3. Method according to claim 1, in which the temperature of calcination of the double salt is carried out at temperatures from about 1100° C. to about 1500° C.

References Cited in the file of this patent
UNITED STATES PATENTS

| 2,140,236 | Lederle | Dec. 13, 1938 |
| 2,166,221 | Patterson | July 18, 1939 |
| 2,218,655 | Peterson | Oct. 22, 1940 |
| 2,346,296 | Espenschied | Apr. 11, 1944 |
| 2,563,307 | Burnham | Aug. 7, 1951 |

FOREIGN PATENTS

| 466,210 | Canada | June 27, 1950 |

OTHER REFERENCES

Mellor: "Comp. Treatise on Inorg. and Theoretical Chem.," vol. 7, pages 91–95.

Barksdale: "Titanium." Copyright 1949, pages 73–76, Ronald Press Co., New York.